United States Patent Office 3,394,097
Patented July 23, 1968

3,394,097
STABLE AQUEOUS ETHYLENE/VINYL ACETATE
COPOLYMER WAX DISPERSIONS
Thomas C. Bissot, Grand Island, N.Y., assignor to E. I.
du Pont de Nemours and Company, Wilmington, Del.,
a corporation of Delaware
No Drawing. Filed July 7, 1965, Ser. No. 470,237
11 Claims. (Cl. 260—28.5)

ABSTRACT OF THE DISCLOSURE

Storage stable aqueous ethylene/vinyl acetate copolymer-wax dispersions are provided. The dispersions contain, based on the total weight of solids, 5–30% copolymer, 70–95% hydrocarbon wax, and 1–10% of a surface active agent selected from the group consisting of sodium and potassium sulfates of straight chain fatty alcohols containing from 10 to 18 carbon atoms. The copolymer contains 18–32 weight percent polymerized vinyl acetate.

---

This invention relates to storage stable aqueous dispersions containing mixtures of ethylene/vinyl acetate copolymers and various hydrocarbon waxes.

Blends of ethylene/vinyl acetate copolymers with various paraffin waxes are commonly employed as coatings on paper and other substrates in order to impart water vapor barrier properties and adhesive characteristics. The function of the ethylene/vinyl acetate copolymers in these mixtures is to provide flexibility and toughness to prevent cracking of the coatings when creased and also to provide increased adhesion where heat sealed to itself or another substrate. Such coatings have been generally applied by hot melt coating techniques. An emulsion coating system for various blends of ethylene/vinyl acetate copolymers and paraffin waxes would be desirable because of the ease of the application. However, such a water-based application system for blends of ethylene/vinyl acetate copolymers with waxes has been unavailable because of the difficulties in preparing emulsions of these blends. A further difficulty has been that the large amount of emulsifying agents typically required to emulsify a paraffin wax which is generally 10 to 50% by weight of the wax renders coating prepared from such emulsions water-sensitive and greatly increases the water vapor transmission rate (W.V.T.R.).

It is, therefore, an object of this invention to provide stable emulsions of mixtures of ethylene/vinyl acetate copolymers and certain hydrocarbon waxes. It is another object of this invention to provide a process for preparing such dispersions which requires a minimum amount of a dispersing agent. It is a further object to provide a process which avoids the use of organic solvents. Other objects will become apparent from the detailed description of the invention which follows.

The objects of this invention are achieved by providing storage-stable aqueous dispersions having a solids content of from about 30 to 70% by weight wherein the dispersed particles have an average size of less than about 2 microns in diameter. The solid particles are comprised of from about 5 to 30% by weight of selected ethylene/vinyl acetate copolymers having a polymerized vinyl acetate content of from about 18 to 32% by weight and 70 to 95% by weight of hydrocarbon waxes having a melting point from about 120° F. to about 200° F. The dispersion contains a small amount, i.e., 1 to 10%, and preferably 3 to 5%, by weight of a selected surface active agent based on solids. The selection of hydrocarbon waxes is not critical. However, it is essential that the ethylene/vinyl acetate copolymers be selected from those having the aforementioned vinyl acetate content. In addition, it is essential that the surface active agent be selected from the sodium and potassium sulfates of straight chain fatty alcohols containing from 10 to 18 carbon atoms.

The process of this invention is carried out by first dissolving the ethylene/vinyl acetate copolymers in the wax. This is accomplished by heating the wax to a temperature above its melting point but below its decomposition temperature and thereafter adding the ethylene/vinyl acetate copolymer either batch-wise or incrementally to the molten wax. The wax/polymer mixture is stirred for a time sufficient to provide a uniform solution and is thereafter combined with a hot aqueous component.

The aqueous component is prepared by dissolving a water-soluble surface active agent of the type described previously in an amount of water sufficient to provide a dispersion which will contain from about 30 to 70% by weight of solids. A preferred surface active agent is sodium lauryl sulfate. The surface active agent is included in the water mixture in an amount sufficient to provide from about 1 to 10% by weight of the agent based on solids in the dispersion.

It has been found that the mechanical stability of the aqueous dispersions of this invention is improved by the addition of small amounts of sodium ion to the water phase. The sodium ion may be added in the form of sodium hydroxide, sodium chloride, sodium sulfate, sodium acetate, etc., to provide an amount of sodium ion (calculated as $Na^+$) from about 0.05 to 0.20% based on the weight of polymer in the aqueous dispersion. It is generally advisable to check the pH of the dispersions and, if necessary, adjust the pH to a range from 8 to 10 using a suitable acid, e.g., dilute sulfuric acid.

After preparation of the aqueous phase, the polymer/wax blend and the aqueous phase are combined using a conventional emulsifying or dispersing mill. The temperature of the aqueous phase should be essentially the same or preferably above that of the molten wax solution and should, of course, be kept below the boiling point of the water. The polymer/wax blend and aqueous phase are usually emulsified for 2 to 20 minutes depending on the mill. Care should be exercised to avoid entraining air into the emulsion as this may cause agglomeration. After emulsification, the product is rapidly cooled to room temperature.

The hydrocarbon waxes which are preferred for use in this invention are the paraffin waxes of petroleum origin. These waxes are mixtures of solid hydrocarbons derived from the overhead wax distillate fraction obtained from the fractional distillation of petroleum. After purification, the paraffin wax contains hydrocarbons that fall within the formulas $C_{23}H_{48}$ to $C_{35}H_{72}$. The waxes are hard, colorless and translucent materials having melting points generally in the range from about 120 to 200° F., preferably 120 to 180° F. The wax component, is, of course, not limited to the waxes of petroleum origin since waxes having similar properties, which are of natural origin, e.g., beeswax and carnauba wax as well as low molecular weight polyethylene wax, i.e., wax having a molecular weight in the range of from about 2000 to 6000 may be used alone or in combination with the petroleum waxes.

The preferred copolymers for the practice of this invention are the ethylene/vinyl acetate copolymers which contain from about 27 to 29% polymerized vinyl acetate. Copolymers containing more than about 32% by weight of vinyl acetate do not give stable dispersions. These polymers, when combined in aqueous emulsions with waxes of the type previously described, give very large particles which tend to separate on standing and do not yield desirable smooth coatings. In addition, stable aqueous dispersions cannot be prepared with copolymers having a vinyl acetate content of less than about 18%. The molecular weight of the ethylene/vinyl acetate copolymers may be varied over a wide range. This range includes those polymers which are commercially available and have a melt index in the range of from about 1 to about 175.

The maximum concentration of ethylene/vinyl acetate copolymer in the paraffin wax will depend to a large degree on the molecular weight, i.e., melt index, of the copolymer. For an ethylene/vinyl acetate copolymer containing about 28% vinyl acetate and having a melt index of 2 to 3, about 15% of the polymer in the wax will have a viscosity of 500–1000 centipoises. For copolymers having melt indices of 15 and 150, concentrations of 20% and 31%, respectively, will give viscosities in the 500–1000 centipoise range (measured at 60° C.). Various combinations of waxes and copolymers may be selected to give optimum dispersions; however, viscosities above about 5000 centipoises should be avoided. The preferred viscosity for obtaining a dispersion with small particles is less than 1000 centipoises.

The flexibility or toughness of coatings provided by dispersions of this invention may be varied by increasing the proportion of polymer in the final dispersion. This is readily accomplished by blending in a quantity of ethylene/vinyl acetate dispersion which has been prepared in accordance with copending application Ser. No. 429,909, filed Feb. 2, 1965. For example, a copolymer/wax dispersion containing 55% solids in the proportion of 85% wax and 15% copolymer and an ethylene/vinyl acetate copolymer dispersion prepared according to the process described in the aforementioned copending application, may be combined to give a dispersion which contains 40% of the copolymer.

In carrying out the process of this invention, determination of the melt index of the copolymers was made by the method described in ASTM D–1238–52T. The Model O Kady Mill used in preparing the dispersion described in the examples is manufactured by the Kinetic Dispersion Corporation, Buffalo, N.Y., and the Manton Gaulin Colloid Mill is manufactured by the Manton Gaulin Company of Everett, Mass.

The following examples in which parts and percentages are by weight unless otherwise specified further illustrate the invention.

Example I

A wax/copolymer blend was prepared by placing 32,000 grams of a commercially available paraffin wax having a melting point between 143 and 150° F. (Union Oil Company's Aristowax 143/150) in a Model O Kady Mill. Steam was introduced into the jacket of the mill until the wax was in a molten state. The mill was started and 8,000 grams of an ethylene/vinyl acetate copolymer containing 28% vinyl acetate and having a melt index of 15 was added through the top port of the mill. The mill was run until the temperature of the melt was raised to 140° C. After cooling the melt to 80° C.±10° C., a water phase, heated to 80° C. and consisting of 2,000 grams of sodium lauryl sulfate and 130 grams of sodium hydroxide pellets in 40,000 grams of distilled water was added. The mill was restarted and run for 30 minutes while maintaining the internal temperature at 80° C.±10° C. A stable aqueous dispersion of a blend of the ethylene/vinyl acetate copolymer and wax (51% solids) resulted on cooling to room temperature. The solid particles in the dispersion had an average diameter of less than 2 microns.

Example II

A wax-ethylene/vinyl acetate copolymer blend was prepared by placing 33,300 grams of the paraffin wax of Example I in a Model O Kady Mill. Steam was introduced into the jacket of the mill until the wax was completely molten. The mill was started and 5,700 grams of ethylene/vinyl acetate copolymer containing 28% of vinyl acetate and having a melt index of 3 was added through the top port of the mill. The mill was run for 30 minutes to form a complete solution of the polymer in the wax. The melt was then cooled below 100° C. and a water phase of 1,900 grams of sodium lauryl sulfate and 100 grams of sodium hydroxide pellets dissolved in 31,000 grams of distilled water was added. The mill was restarted and run for 30 minutes keeping the internal temperature at 80° C.±10° C. by adjusting the flow of cooling water through the jacket of the mill. The resulting dispersion was cooled to room temperature and the pH adjusted to 9.0 using dilute sulfuric acid. A stable aqueous dispersion was formed.

The dispersion which contained 57% solid particles and had an average particle size of less than 2 microns in diameter was fortified using a quantity of an ethylene/vinyl acetate copolymer containing 28% vinyl acetate and having a melt index of 3 which had been dispersed in an aqueous medium using the process described in copending application Ser. No. 429,909 to give a dispersion in which the solids composition was 60% wax and 40% copolymer. This product was coated onto a 30 lbs./ream glassine paper using a coating weight of 8 lbs/ream. The coating was heated to a temperature slightly above the melting point of the wax for a brief period to coalesce the film. The coated product had excellent vapor barrier properties giving a creased W.V.T.R. (gm. $H_2O$/100 in.$^2$/24 hours) of 0.4.

The procedure of this example was repeated except that a paraffin wax having a melting point of about 145° F. (Atlantic Refining Company's Atlantic 1116 wax) was substituted for the Aristowax. Substantially identical results were obtained.

Example III

A blend of 850 grams of wax (Sun Oil Company's 5512 wax having a melting point of 156° F.) and 425 grams of wax (Sun Oil Company's 985Y microcrystalline wax having a melting point of 193° F.) and 225 grams of an ethylene/vinyl acetate copolymer having a vinyl acetate content of 28% and a melt index of 12 to 18 was prepared by dissolving the copolymer in the molten wax. In a separate vessel, a water phase of 105 grams of sodium lauryl sulfate and 4 grams of sodium hydroxide dissolved in 1500 grams of distilled water was prepared. Both phases were heated to above 90° C. and then emulsified in a preheated laboratory Manton Gaulin colloid mill. The resulting emulsion was degased by applying vacuum while the material was maintained at 80° C. The emulsion was then cooled to room temperature. A dispersion having an 85% wax/15% copolymer content in which substantially all of the particles had a diameter less than 1 micron resulted.

Example IV

In this example an ethylene/vinyl acetate copolymer having a vinyl acetate content outside the critical range, i.e., above 32%, was used. A blend of 800 grams of the Aristowax of Example I and 200 grams of an ethylene/vinyl acetate copolymer having a vinyl acetate content of 33% and a melt index of 25 was prepared. This blend was emulsified as described in Example III using 1,000 grams of distilled water containing 50 grams of sodium lauryl sulfate. The resulting dispersion was not storage-stable and contained particles as large as 30 microns in diameter.

Example V

In this example surface active agents other than fatty alcohol sulfates containing 10 to 18 carbon atoms were used.

The process of Example I was repeated except that in one experiment sodium rosinate was substituted for the sodium lauryl sulfate and in a second experiment potassium oleate was substituted for the sodium lauryl sulfate. The dispersions resulting from both experiments were unstable.

Example VI

This example illustrates the unacceptability of potassium oleate as a dispersing agent.

A blend of 800 grams of Aristowax 143/150, 200 grams of an ethylene/vinyl acetate copolymer having a vinyl acetate content of 28% and a melt index of 12 to 18 and 35 grams of oleic acid was prepared by melting the wax and dissolving the polymer and acid in the molten wax. The melt was emulsified with a water phase of 1,000 grams of distilled water containing 7 grams of potassium hydroxide using the procedure and apparatus described in Example III. This emulsion coagulated to a solid mass upon cooling below 50° C.

Dispersions which are stable can be prepared according to the procedure outlines in the foregoing Examples I to III using a variety of other commercially available waxes and ethylene/vinyl acetate copolymers. In addition to the surface active agents previously described, other $C_{10}$ to $C_{18}$ straight chain sodium and potassium fatty alcohol sulfates such as those derived from undecyl, myristic and cetyl alcohols may be used. Various additives such as pigments and antioxidants may be included in the dispersions.

The wax-ethylene/vinyl acetate dispersions of this invention may be used in a number of applications in the textile field, for example, as fabric softeners, lubricants and waterproofing materials for tents, tarpaulins and rain wear. The dispersions when fortified with ethylene/vinyl acetate copolymer dispersions of the type described in copending application Ser. No. 429,909 have a number of applications in the treating of paper and films. They may be used as coatings to impart desirable water vapor transmission rates to coated articles. They may also be used as heat-sealable adhesives.

The principal advantage accruing from this invention is in providing stable wax/polymer emulsions which are free from organic solvents and contain a minimum amount of surface active or emulsifying agents. The dispersions can be used on conventional paper coating equipment and do not require specialized hot melt coating apparatus for application.

I claim:

1. A storage-stable aqueous dispersion having a solids content of from about 30 to 70% by weight wherein the solid particles have an average particle size of less than about 2 microns in diameter, said dispersion being comprised of from about 1 to 10% by weight, based on the total weight of solids, of a surface active agent, from about 5 to 30% by weight, based on the total weight of solids, of a copolymer of ethylene and vinyl acetate, and from about 70 to 95% by weight, based on the total weight of solids, of a hydrocarbon wax, said surface active agent being selected from the group consisting of sodium and potassium sulfates of straight chain fatty alcohols containing from 10 to 18 carbon atoms, said copolymer having a polymerized vinyl acetate content of from about 18 to 32% by weight and said wax having a melting point from about 120° F. to about 200° F.

2. The product of claim 1 wherein said copolymer has a vinyl acetate content of about 27 to 29% by weight and a melt index from 1 to 175.

3. The product of claim 2 wherein said wax is a paraffin wax having a melting point from 120° F. to 180° F.

4. The product of claim 2 wherein said dispersion contains from about 3 to 5% by weight of said surface active agent.

5. A storage-stable aqueous dispersion having a solids content of from about 30 to 70% by weight wherein the solid particles have an average particle size of less than about 2 microns in diameter, said dispersion being comprised of from about 1 to 10% by weight, based on the total weight of solids, of a surface active agent, from about 5 to 40% by weight, based on the total weight of solids, of a copolymer of ethylene and vinyl acetate, and from about 60 to 95% by weight, based on the total weight of solids, of a hydrocarbon wax, said surface active agent being selected from the group consisting of sodium and potassium sulfates of straight chain fatty alcohols ctontaining from 10 to 18 carbon atoms, said copolymer having a polymerized vinyl acetate content of from about 18 to 32% by weight and said wax having a melting point from about 120° F. to about 200° F.

6. A process for preparing an aqueous dispersion of solid particles which comprises heating a water-insoluble wax having a melting point in the range from about 120° F. to 200° F. to a temperature above its melting point and below its decomposition temperature, dissolving a copolymer of ethylene and vinyl acetate in said wax to form a copolymer/wax blend containing from 5 to 30% by weight of said copolymer and thereafter dispersing said blend in an aqueous medium consisting essentially of water and an amount of a water-soluble surface active agent sufficient to provide from about 1 to 10% by weight of said agent based on solids, said copolymer having a polymerized vinyl acetate content of from about 18 to 32% by weight and said surface active agent being selected from the group consisting of sodium and potassium sulfates of straight chain fatty alcohols containing from 10 to 18 carbon atoms.

7. The process of claim 6 wherein said surface active agent is sodium lauryl sulfate.

8. The process of claim 6 wherein said surface active agent is present in an amount from about 3 to 5% by weight.

9. The process of claim 7 wherein from about 0.05 to 0.20% by weight of sodium ion (calculated as $Na^+$) is added to said aqueous medium.

10. The process of claim 7 wherein said copolymer has a vinyl acetate content of about 27 to 29% by weight and a melt index from 1 to 175.

11. The process of claim 10 wherein said wax is a paraffin wax having a melting point from 120° F. to 180° F.

References Cited

UNITED STATES PATENTS

| | | | |
|---|---|---|---|
| 2,313,144 | 3/1943 | Gomm | 260—29.6 |
| 3,272,690 | 9/1966 | Shadan | 260—28.5 |

JULIUS FROME, *Primary Examiner.*